(12) United States Patent
Philbin et al.

(10) Patent No.: US 8,898,701 B2
(45) Date of Patent: Nov. 25, 2014

(54) METHOD AND SYSTEM FOR PROVIDING ATTRIBUTE BROWSING OF VIDEO ASSETS

(75) Inventors: David A. Philbin, Arlington, MA (US); James E. Paschetto, Waltham, MA (US); Beau D. Morley, Somerville, MA (US); Christina L. Fyock, Sudbury, MA (US); Xi Zhang, Newton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1195 days.

(21) Appl. No.: 11/618,096

(22) Filed: Dec. 29, 2006

(65) Prior Publication Data

US 2008/0163328 A1    Jul. 3, 2008

(51) Int. Cl.
| | |
|---|---|
| H04N 5/445 | (2011.01) |
| G06F 3/00 | (2006.01) |
| G06F 13/00 | (2006.01) |
| H04N 21/8543 | (2011.01) |
| G06F 17/30 | (2006.01) |
| H04N 7/173 | (2011.01) |
| H04N 21/482 | (2011.01) |
| H04N 21/84 | (2011.01) |

(52) U.S. Cl.
CPC ....... *H04N 7/17318* (2013.01); *H04N 21/8543* (2013.01); *G06F 17/30858* (2013.01); *H04N 21/4828* (2013.01); *H04N 21/4821* (2013.01); *H04N 21/84* (2013.01); *G06F 17/30849* (2013.01); *G06F 17/30817* (2013.01)
USPC .................................. 725/44; 725/45; 725/52

(58) Field of Classification Search
USPC ................. 725/37, 45, 100, 131, 139, 38–44, 725/46–61
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |

(Continued)

*Primary Examiner* — Pankaj Kumar
*Assistant Examiner* — Randy Flynn (57) ABSTRACT

An approach is provided for faceted browsing of video assets. A metadata file is parsed to categorize and rank attributes corresponding to a video asset, wherein the ranked attributes are based on a criterion. A set-top box provides attribute browsing to determine selection of the video asset.

17 Claims, 6 Drawing Sheets

(56) References Cited

U.S. PATENT DOCUMENTS

| | | | |
|---|---|---|---|
| 5,784,061 A * | 7/1998 | Moran et al. | 715/835 |
| 5,790,198 A | 8/1998 | Roop et al. | |
| 5,801,787 A | 9/1998 | Schein et al. | |
| 5,802,361 A * | 9/1998 | Wang et al. | 382/217 |
| 5,808,608 A | 9/1998 | Young et al. | |
| 5,809,204 A | 9/1998 | Young et al. | |
| 5,812,123 A * | 9/1998 | Rowe et al. | 725/45 |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,668,133 B2 | 12/2003 | Yuen et al. | |
| 6,687,906 B1 | 2/2004 | Yuen et al. | |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,842,761 B2 * | 1/2005 | Diamond et al. | 707/100 |
| 6,850,693 B2 | 2/2005 | Young et al. | |
| 6,859,799 B1 | 2/2005 | Yuen | |
| 6,956,573 B1 * | 10/2005 | Bergen et al. | 348/E7.071 |
| 7,039,935 B2 | 5/2006 | Knudson et al. | |
| 7,069,576 B1 | 6/2006 | Knudson et al. | |
| 7,487,529 B1 | 2/2009 | Orlick | |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2003/0005445 A1 | 1/2003 | Schein et al. | |
| 2003/0056219 A1 | 3/2003 | Reichardt et al. | |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2004/0010806 A1 | 1/2004 | Yuen et al. | |
| 2004/0045025 A1 | 3/2004 | Ward et al. | |
| 2004/0088208 A1 * | 5/2004 | Runge et al. | 705/10 |
| 2004/0107437 A1 | 6/2004 | Reichardt et al. | |
| 2004/0143604 A1 * | 7/2004 | Glenner et al. | 707/200 |
| 2004/0168189 A1 | 8/2004 | Reynolds et al. | |
| 2004/0194138 A1 | 9/2004 | Boylan et al. | |
| 2004/0194140 A1 * | 9/2004 | Rao et al. | 725/37 |
| 2004/0210936 A1 | 10/2004 | Rao et al. | 725/39 |
| 2004/0254950 A1 * | 12/2004 | Musgrove et al. | 707/102 |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0114794 A1 * | 5/2005 | Grimes et al. | 715/840 |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0160458 A1 * | 7/2005 | Baumgartner | 725/46 |
| 2005/0216936 A1 | 9/2005 | Knudson et al. | |
| 2005/0228806 A1 * | 10/2005 | Haberman | 707/100 |
| 2005/0251824 A1 | 11/2005 | Thomas et al. | |
| 2005/0289593 A1 * | 12/2005 | Spilo | 725/45 |
| 2006/0031916 A1 * | 2/2006 | Colter et al. | 725/45 |
| 2006/0156336 A1 | 7/2006 | Knudson et al. | |
| 2006/0212894 A1 | 9/2006 | Knudson et al. | |
| 2006/0277574 A1 | 12/2006 | Schein et al. | |
| 2006/0288366 A1 | 12/2006 | Boylan et al. | |
| 2007/0011702 A1 * | 1/2007 | Vaysman | 725/45 |
| 2007/0016926 A1 | 1/2007 | Ward et al. | |
| 2007/0033613 A1 | 2/2007 | Ward et al. | |
| 2007/0107010 A1 | 5/2007 | Jolna et al. | |

* cited by examiner

| 401 | 403 | 405 |
|---|---|---|
| Type | Movie | Sitcom |
| Name | Tough Mission III | Funny Earl |
| Episode | | Mailbox |
| Year | 2006 | 2006 |
| Rating | PG-13 | PG |
| Date | On-Demand | 11/9/2006 |
| Start | On-Demand | 8:00pm |
| Length | 126 | 30 |
| Price | 3.95 | FREE |
| HD | Y | Y |
| Country | U.S. | U.S. |
| Actor | Tom Action | Jason Fun |
| Role | Dan Hunter | Earl Hiccups |
| Plot | Dan Hunt comes face to face with a dangerous and sadistic arms dealer while trying to keep his identity secret in order to protect his girlfriend. | A bored Catalina offers to help Earl with number 75 on his list, cleaning out a mailbox he once used as a trash can. |

METHOD AND SYSTEM FOR PROVIDING ATTRIBUTE BROWSING OF VIDEO ASSETS

BACKGROUND INFORMATION

The media industry has many avenues for providing users with entertainment sources, through television, film, gaming, etc. As the number of available broadcast channels, IPTV (Internet Protocol television) sources, recorded programs, on-demand videos, and on-demand games grow in number, users face the daunting task of trying to find programs of interest. Locating an item of interest among the thousands of items of content, in a television environment, poses a major challenge in that time spent searching undercuts the objective of providing the user with more variety. Reduction or streamlining of content is unacceptable, particularly in light of the competitive landscape of media delivery. However, the user's task of selecting desired content becomes more onerous as the number and variety of content continues to increase. For instance, content from IP sources can be made available to television (TV) systems; the global Internet is replete with user generated video streams, web casts, etc. Undoubtedly, the user interface must keep pace with the explosion of content.

Common methods of locating content include text search and category browsing. Text search can accurately find content, but is slow and cumbersome with the current generation of remote control technologies. Category hierarchies, such as those employed in many current video-on-demand (VOD) systems, are slow and often result in empty or non-interesting sets of results. This causes users to "bob" through the groupings: traversing deep into one area of the hierarchy, coming back up, traversing down yet another area. It is noted that users often trying to find a branch they had viewed previously before finally choosing a program. This laborious process can easily discourage a user from selecting content all together; in a pay-per-view scenario, this results in loss of revenue for the service providers.

Therefore, there is a need for efficiently browsing through content listings.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

In apparatus, method, and software for attribute browsing of video assets are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments of the present invention are described with respect to video assets, it is contemplated that these embodiments have applicability to other media.

Figure 1:
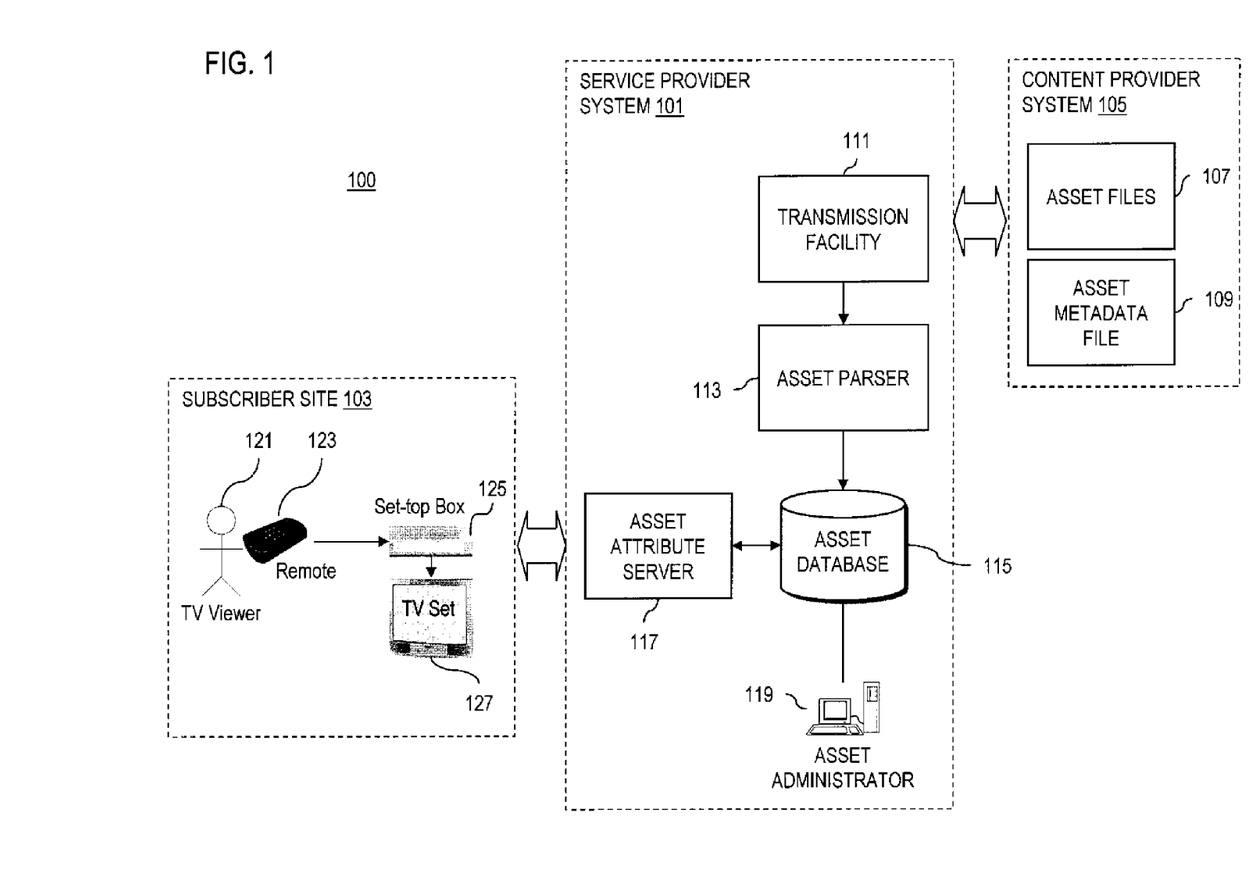
FIG. 1 is a diagram of a system capable of providing faceted browsing of video assets, according with an exemplary embodiment.

FIG. 1 is a diagram of a system capable of providing faceted browsing of video assets, according with an exemplary embodiment. A video delivery system 100 includes a service provider system 101 serving multiple subscriber sites 103 (of which only one is shown). The service provider system 101 communicates with one or more content provider systems 105. It is contemplated that the service provider can also be the content provider in some instances. The content provider system 105, by way of example, maintains content as asset files 107 along with metadata files 109 corresponding to various assets. In certain exemplary embodiments, these assets are video assets, which include on-demand videos, broadcast programs, games, IPTV (Internet Protocol Television), digital video recordings, broadcast television program guide data, etc. Such assets can delivered to the service provider system 101 through any variety of transmission facility 111.

The service provider system 101, in an exemplary embodiment, utilizes an asset parser 113 to parse the metadata files of the assets. The metadata can be in form of an extensible Markup Language (XML) file, for example. The parser 113 categorizes attributes of the assets for storage in an asset database 115. This database 115 is accessible via an asset attribute server 117. Additionally, the asset database 115 is administered by an asset administrator 119.

At the subscriber site 103, a user 121 can utilize a remote controller 123 to interface a set-top box 125 to select the asset (e.g., programming) for viewing by a display 127. The remote controller 123 can employ infrared, radio frequency (RE) signals, or other wireless links (e.g., BLUETOOTH) to communicate with the set-top box 125. Additionally, it is contemplated any type of input interface can be used; e.g., a keypad on the set-top box 125, a game controller, a keyboard that is separate from the set-top box 125, mouse, etc. The user can navigate a large amount of content through an "attribute browsing" capability to find a specific asset. The system 100, in an exemplary embodiment, applies "faceted browsing" techniques to the meta-data provided with the types of assets. This browsing capability, in certain embodiments, can be implemented as part of an interactive program guide (IPG), or other applications.

"Faceted browsing" addresses the shortcomings of the conventional text search and category browse methods. Faceted browsing refers to a method of searching through a set of objects based on attributes of those objects (e.g., name, color, weight, size, etc.), and using those attributes to refine the scope of the objects that are shown. As an illustration of this concept, the selection of fruits and vegetables is described. One could first select only items that are green, and further from the resulting set, select only items weighing more than a certain weight, e.g., 7 pounds. Accordingly, finding a watermelon in the remaining set would be much simpler than finding watermelon from all fruits and vegetables.

It is recognized that in the environment of the subscriber site 103, simplicity of the interface for the "television with remote control" environment is important in consumers' willingness to subscribe to more and more content. Accordingly, the system 100 uses, in an exemplary embodiment, the attributes describing the available assets to enable the viewer to compose complex searches in a step-wise fashion, with a presentation of possible attributes and matching video assets at each step of the process. This type of search process would not frustrate the viewer in that return of null set of matches is avoided. This search process has the added advantage of being well-suited to the television user-interface with its "highlight and click" paradigm. This browsing technique is supported through manipulation of the metadata (or attributes), as explained in FIG. 2.

Figure 2:
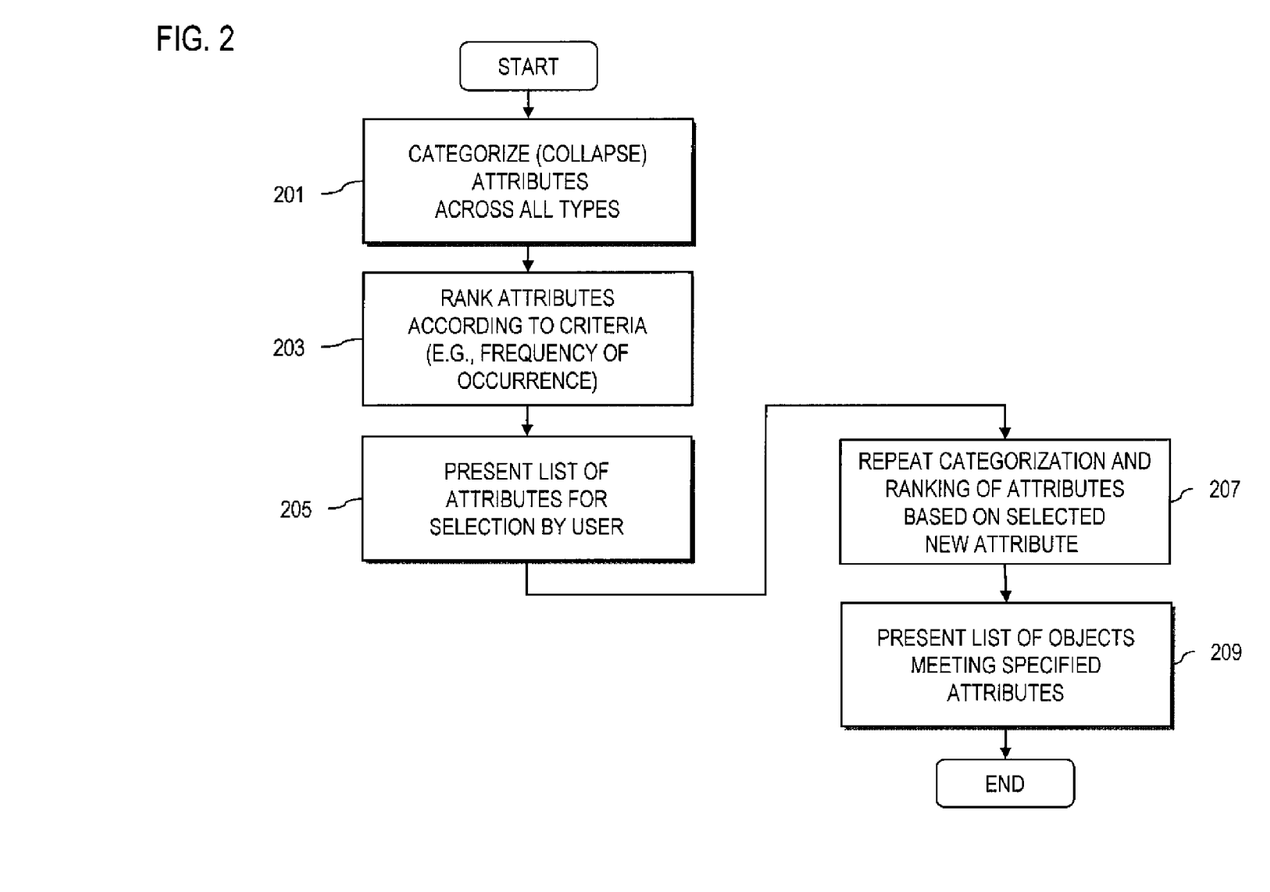
FIG. 2 is a flowchart of a process for collapsing and ranking attributes in support of faceted browsing, according to an exemplary embodiment.

FIG. 2 is a flowchart of a process for collapsing and ranking attributes in support of faceted browsing, according to an exemplary embodiment. The process involves categorizing (e.g., collapsing), as in step 201, a list of attributes across all the types (e.g., rating, price, genre, etc.), and ranking the attributes based on a criterion (step 203). For example, one criterion can specify the frequency of occurrence of the attribute. This yields a list of attributes from which the user may select from, as in step 205. Also, a resulting list of all assets that meet the filter requirements of the attributes that have been selected. This browsing mechanism also allows the viewer to "window shop" and to view all the video assets that are available within a selected set of filters. For example, if the viewer were to pick a category of "foreign" and then the country (e.g., "Italy"), the user may find assets, such as movies in the Italian language, movies with Italian themes, music videos from Italian bands, and/or games set in Italy. This type of browsing highlights what content the system 100 has to offer rather than unavailable content.

As seen in FIG. 2, the process can be repeated using newly selected attributes, as in step 207. Thereafter, the user is presented with a list of objects meeting the specified attributes, per step 209.

The above arrangement enables users to quickly browse large sets of assets, and to narrow the collection of assets based on metadata types of interest to the user.

Figure 3:
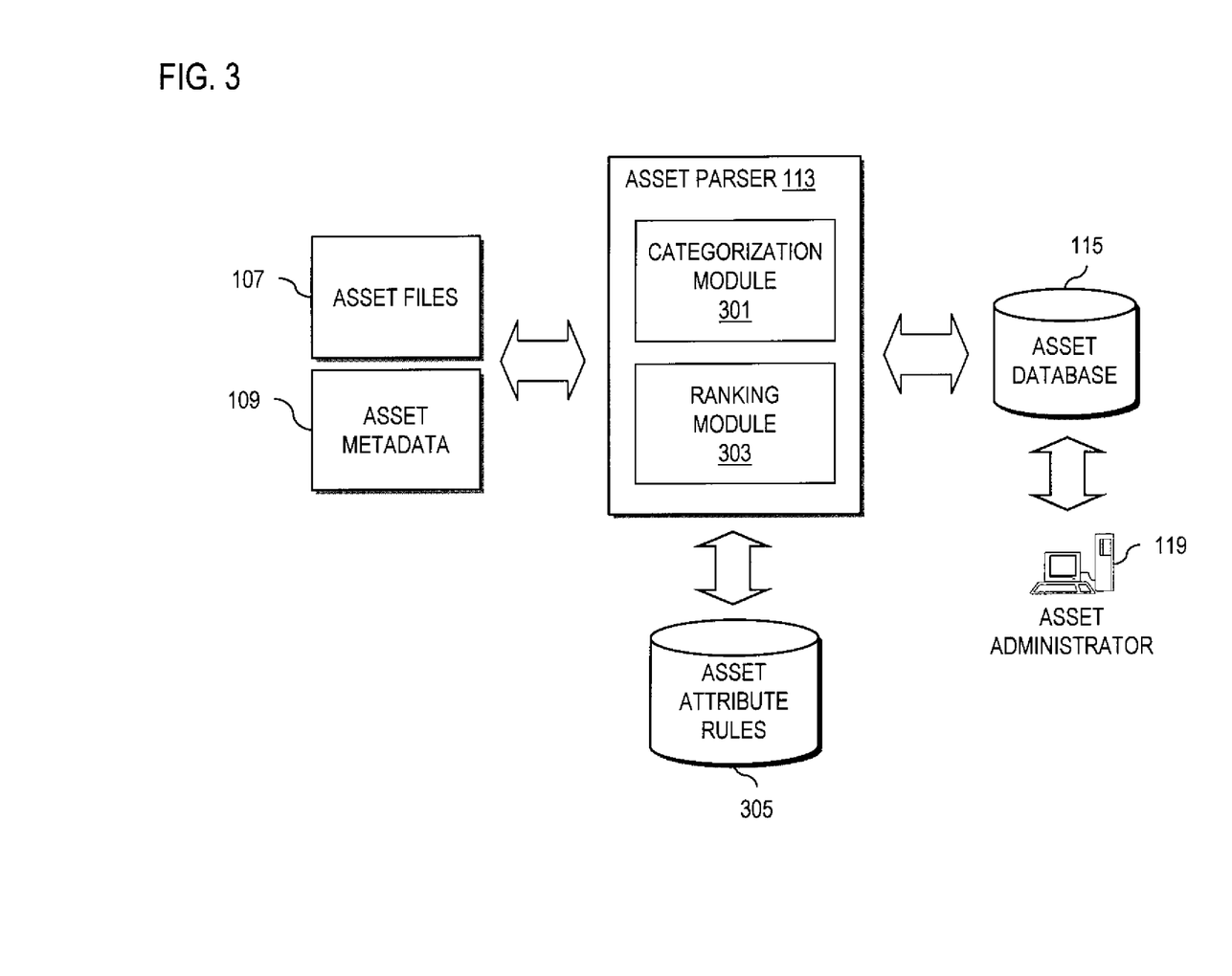
FIG. 3 is a diagram of a system for managing video assets, according to an exemplary embodiment.

FIG. 3 is a diagram of a system for managing video assets, according to an exemplary embodiment. The asset parser 113 of the system 100 includes a categorization module 301 for categorizing attributes of the assets and a ranking module 303 to rank the attributes. The ranking module 303 operates in conjunction with attribute rules or criteria applied to the attributes, such as frequency of occurrence. These rules or criteria are stored in an asset attribute rules database 305; such rules can be determined by the service provider through the administrator 119. For the purposes of illustration, assets are delivered to the transmission facility 111 with, for example, an XML file describing the assets.

As mentioned, the metadata 109 can be in form of an XML file, according to an exemplary embodiment. For instance, Tables 1 and 2 show exemplary XML files, which the asset parser 113 can process.

TABLE 1

```
<asset>
    <type>movie</type>
    <content_filesize>522</content_filesize>
    21 title>Tough Mission III</title>
    <genre>action</genre>
    <MPAA_rating>PG-13</ MPAA_rating>
    <production_year>2006</production_year>
    <plot_summary>Dan Hunt comes face to face with a dangerous and
        sadistic arms dealer while trying to keep his identity secret in
        order to protect his girlfriend, </plot_summary>
```

TABLE 1-continued

```
    <director>J.J. Shoot</director>
    <runtime>126</runtime>
    <suggested_price>3.95</suggested_price>
    <language>English</language>
    <country>U.S.</country>
    <actor>
        <name>Action, Tom</name>
        <role>Dan Hunt</role>
    </actor>
</asset>
```

TABLE 2

```
<asset>
    <type>sitcom</type>
    <name>Funny Earl</name>
    <episode_name>Mailbox</episode_name>
    <VCHIP_rating>TV-PG</ VCHIP_rating>
    <description>A bored Catalina offers to help Earl with number 75 on
        his list, cleaning out a mailbox he once used as a trash can.
        </plot_summary>
    <showdate>11/9/2006</showdate>
    <start>8:00pm</start>
    <minutes>30</minutes>
    <suggested_price>0.00</suggested_price>
    <high_definition>No</high_definition>
    <actor>
        <FirstName>Jason</FirstName>
        <LastName>Fun</LastName>
        <role>Earl Hiccups</role>
    </actor>
</asset>
```

Figure 4:
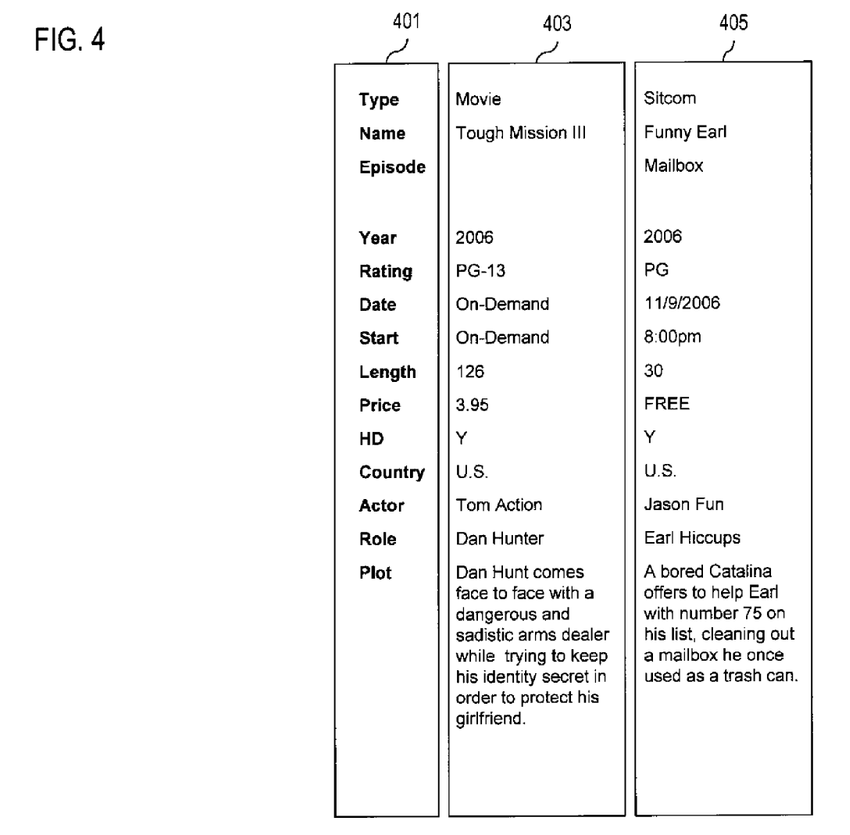
FIG. 4 is a flowchart of a process for asset selection, according to various exemplary embodiments.

The above XML files can be formulated in a download video asset file, as shown in FIG. 4. As described earlier, this file can include information describing the video asset. A similar XML file can be provided for each program available on broadcast television, for example. The file can span a certain period (e.g., 2 weeks) of broadcast, and can be updated periodically (e.g., on a daily basis). This XML file can be used to generate a program "grid" for providing information about each broadcast program, such as program name, episode name, V-Chip rating, actors, and plot summary. As new types of content become available, such as user generated content (e.g., IP sources), such content will also include XML information detailing the new type of content.

The asset parser 119 parses the XML files to obtain a database of video assets and the attributes associated with each one. For example, attributes such as "Content_Filesize" are ignored; and synonyms are substituted where appropriate, such as "Free" in place of "Suggested_Price 0.00." Also, differences in naming conventions are properly handled, such as "Action,Tom" in the video-on-demand files and FirstName="Tom" MiddleName=" " LastName="Action" in the broadcast television file.

FIG. 4 is a diagram of a video asset file, according to an exemplary embodiment. Section 401 specifies the fields for the asset, as enumerated in Table 3. Sections 403 and 405 provide values of the particular assets.

TABLE 3

| FIELD | DESCRIPTION |
| --- | --- |
| Type | Category of video asset |
| Name | Title of the video asset |
| Episode | Episode information |
| Year | Year the asset was released |
| Rating | Rating information (e.g., Motion Picture Association of America |

TABLE 3-continued

| FIELD | DESCRIPTION |
| --- | --- |
| | (MPAA) rating information) |
| Date | Date available for viewing |
| Start | Start time |
| Length | Duration of video asset |
| Price | Cost of the video asset per viewing |
| HD | Specifies whether High Definition (HD) format |
| Country | Country where asset was produced |
| Actor | Name of actors |
| Role | Role of actors |
| Plot | Plot summary |

Figure 5:
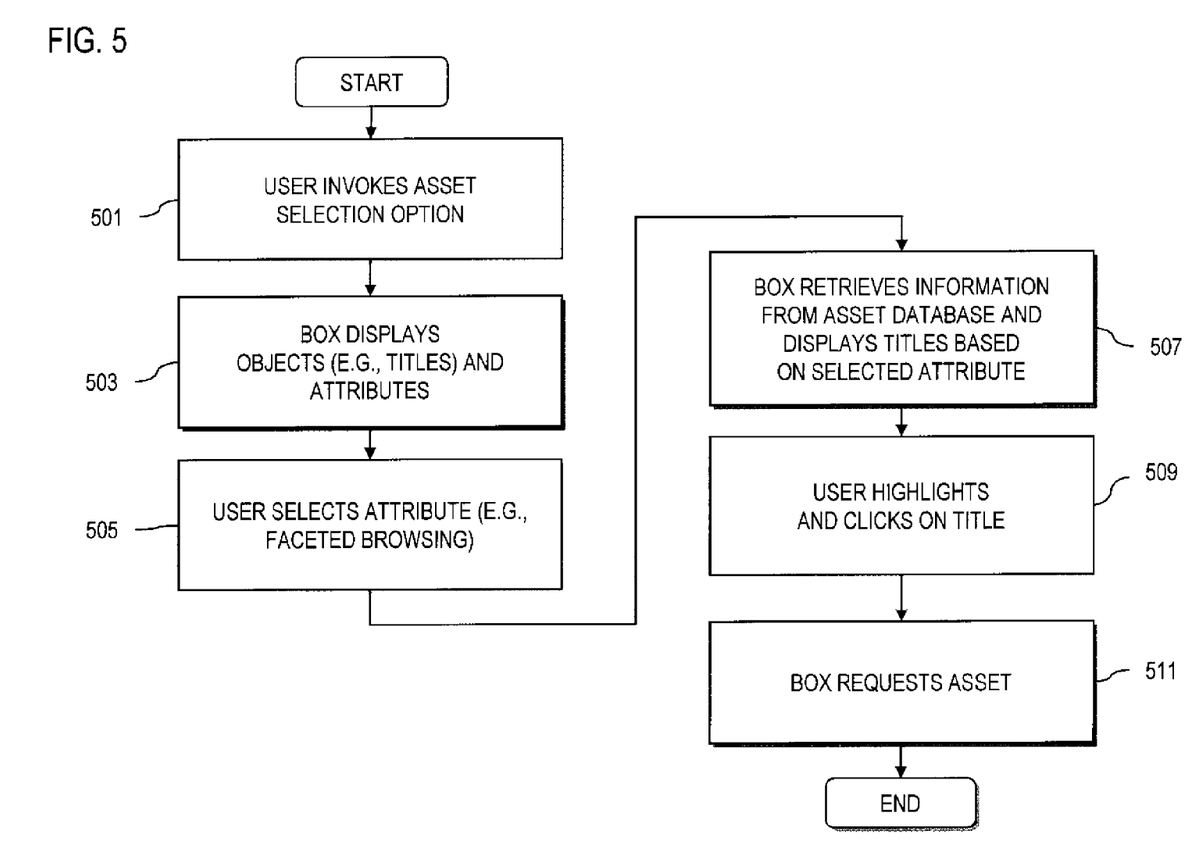
FIG. 5 is a diagram of a video asset file, according to an exemplary embodiment.

FIG. 5 is a flowchart of a process for asset selection, according to various exemplary embodiments. This scenario involves the user 121 using the remote control device 123 to invoke an asset selection option, as in step 501. The set-up box 107 then displays, as in step 503, asset information—e.g., list of objects (e.g., video titles) with associated attributes. In an exemplary embodiment, two lists are presented: an initial list of all attributes, sorted by frequency; and a list of all video titles, sorted alphabetically, for instance. Alternatively, the list of titles can be sorted by a "popularity/time of day" relevance score. The user 121 can subsequently select an attribute, per step 505. In other words, to find a video of interest, the user can scan the list of titles, or narrow the title list by "clicking" an attribute. That clicked (or selected) attribute is used as a filter to generate a new, smaller list of titles (in which all the titles have that attribute, sorted as mentioned above). It is noted that the list can be expanded at any time by "de-selection" of an attribute.

In turn, the set-top box 107, per step 507, retrieves content information (e.g., list of titles) from the asset database 115 corresponding to the selected attribute and displays the retrieved list of titles. From this new list of titles, a new list of attributes is generated—e.g., the attributes of all the titles in the new list, sorted by frequency. At this point, the user 121 can further narrow the listings by selection of other attributes. The user can further refine the list of titles by clicking another item in the list of attributes, or expand the list of titles by removing one of the attributes in the current filter set. Each chosen attribute becomes a filter term, logically "AND-ed" together to refine the list of titles (and the associated list of attributes of those titles). A "back" function can be added to "undo" an added search term (attribute). In this way a user can quickly narrow a long list of titles using any attributes of interest. Further, because each successive list of attributes is derived from the just-narrowed list of titles, clicking any attribute at any step along the navigation path will return at least one title.

To further illustrate faceted browsing, if in the initial list the user 121 clicked on the attribute "PG," the list of all titles would be replaced by only those titles having as one of their attributes an MPAA rating of "PG." Additionally, the list of attributes would be replaced by a list of all the attributes of this reduced set of PG titles (e.g., ordered by frequency). The selection of an attribute, for example, could specify a maximum or minimum value. Using this example, selecting PG may result in a result set that contains everything PG or less, including G and TV-Y, etc.

Moreover, some of these "PG" titles can be tagged as a "Comedy" in their XML files, such that "Comedy" would appear in this new attribute list. If the user clicks "Comedy" in this attribute list, then the list of all titles would be replaced by only those titles having both attributes "PG" and "Comedy." The attribute list would be replaced by a list of all the remaining attributes of this new set of titles.

It is noted that these "PG comedies" can be tagged as High-Definition (HD) in their XML files, so "High-Definition" would appear in the new attribute list. By clicking "High-Definition" the user will receive a list of "PG comedies in High-Definition", etc.

At some point during the browsing process, the list of titles will be narrowed to a usable or workable number of entries. In step 509, the user 121 can highlight a selection using the remote control device 123 and "clicks" on the title. In step 511, the set-top box requests the selected asset. Alternatively, by selecting an item in the title list, the user 121 can be directed to other options, such as watching a preview, paying for viewing rights (for video-on-demand content), setting the DVR to record (for broadcast), etc.

This searching capability (i.e., attribute browsing) permits finding niche content more quickly than the traditional text search method.

The above described processes relating to faceted browsing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
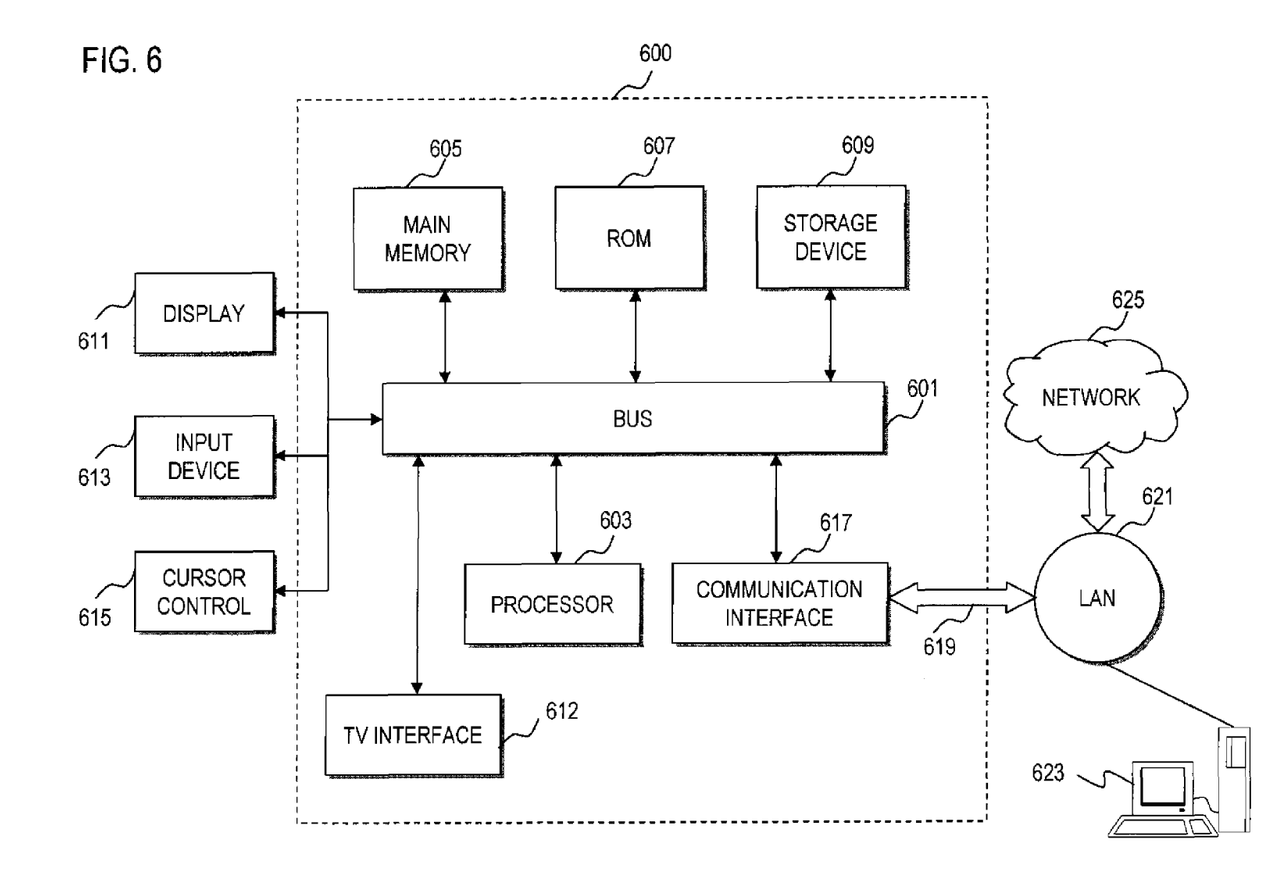
FIG. 6 is a diagram of a computer system that can be used to implement various exemplary embodiments.

FIG. 6 illustrates a computer system 600 upon which an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. A TV interface 612 can optionally be provided to output to a television set. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the exemplary embodiment. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:

categorizing, by a processor, a first set of attributes associated with a first list of objects, wherein each of the objects represents a video asset that is associated with one or more of the attributes of the first set;

ranking, by the processor, the first set of attributes according to a criterion associated with one or more characteristics of the attributes, wherein the criterion specifies a frequency of occurrence of an attribute of the first set of attributes;

presenting the first list of objects and associated attributes;

receiving a first input indicating selection of at least one of the attributes of the first set;

collapsing the first list of objects into a second list of objects consisting of a subset of the first list of objects, wherein the subset consists of the objects associated with the selected attributes;

generating, by the processor, a second set of attributes based on the second list of objects, the second set of attributes comprising a non-selected attribute of the first set of attributes, wherein each of the attributes of the second set of attributes is associated with at least one object of the second list of objects;

ranking, by the processor, the second set of attributes according to the criterion, wherein the criterion specifies a frequency of occurrence of an attribute of the second set of attributes;

presenting the second list of objects and associated attributes in response to the first input;

receiving a second input indicating selection of one of the objects in the second list; and retrieving the video asset corresponding to the one selected object, wherein the selection of the at least one of the attributes of the first set of attributes specifies a maximum and/or minimum value.

2. A method according to claim 1, further comprising:

receiving a metadata file including the first set of attributes, wherein the categorizing of the first set of attributes includes parsing the metadata.

3. A method according to claim 2, wherein the file has an extensible markup language (XML) format.

4. A method according to claim 2, wherein the file is retrieved on a periodic basis.

5. A method according to claim 1, wherein the video asset includes a video file, a broadcast program, a video game, or a combination thereof.

6. A method according to claim 1, wherein the first input is provided by a user via a remote control device.

7. An apparatus comprising:

a processor configured to categorize and rank a first set of attributes based on a criterion associated with one or more characteristics of the attributes, the first set of attributes being associated with a first list of objects, and to present the first list of objects and associated attributes, wherein each of the objects represents a video asset that is associated with one or more of the attributes of the first set and the criterion specifies a frequency of occurrence of an attribute of the first set of attributes; and an input interface configured to receive a first input indicating selection of at least one of the attributes of the first set;

wherein the processor is further configured to, collapse the first list of objects into a second list of objects consisting of a subset of the first list of objects, wherein the subset consists of the objects associated with the selected attributes, generate a second set of attributes based on the second list of objects, the second set of attributes comprising a non-selected attribute of the first set of attributes, wherein each of the attributes of the second set of attributes is associated with at least one object of the second list of objects, rank the second set of attributes according to the criterion, wherein the criterion specifies a frequency of occurrence of an attribute of the second set of attributes, and present the second list of objects and associated attributes in response to the first input; and wherein the input interface is further configured to receive a second input indicating selection of one of the objects in the second list, in response to which the processor retrieves the video asset corresponding to the one selected object, wherein the selection of the at least one of the attributes of the first set of attributes specifies a maximum and/or minimum value.

8. An apparatus according to claim 7, wherein the processor is further configured to communicate with a server to obtain a metadata file that includes the first set of attributes, and the categorizing of the first set of attributes includes parsing the metadata.

9. An apparatus according to claim 8, wherein the file has an extensible markup language (XML) format.

10. An apparatus according to claim 8, wherein the file is retrieved on a periodic basis.

11. An apparatus according to claim 7, wherein the video asset includes a video file, a broadcast program, a video game, or a combination thereof.

12. An apparatus according to claim 7, wherein the input interface is configured to receive a signal representing the first input from a remote control device.

13. A system comprising:

an asset parser configured to parse a metadata file to categorize and rank a first set of attributes based on a criterion associated with one or more characteristics of the attributes, the first set of attributes being associated with a first list of objects, wherein each of the objects represents a video asset that is associated with one or more of the attributes of the first set and the criterion specifies a frequency of occurrence of an attribute of the first set of attributes;

an asset server configured to communicate with the asset parser and to transmit the first list of objects and the associated ranked attributes; and a set-top box, wherein the set-top box is configured to present the first list of objects and associated ranked attributes;

wherein, responsive to a first input indicating a selection of at least one of the attributes of the first set, the asset parser is further configured to, collapse the first list of objects into a second list of objects consisting of a subset of the first list of objects, wherein the subset consists of the objects associated with the selected attributes, generate a second set of attributes based on the second list of objects, the second set of attributes comprising a non-selected attribute of the first set of attributes, wherein each of the attributes of the second set of attributes is associated with at least one object of the second list of objects, and rank the second set of attributes according to the criterion, wherein the criterion specifies a frequency of occurrence of an attribute of the second set of attributes;

wherein the asset server is further configured to transmit the second list of objects and associated ranked attributes to the set-top box; and wherein the set-top box is further configured to present the second list of objects and associated ranked attributes, and, responsive to a second input indicating a selection of one of the objects in the second list, to retrieve the video asset corresponding to the one selected object, wherein the selection of the at least one of the attributes of the first set of attributes specifies a maximum and/or minimum value.

14. A system according to claim 13, wherein the metadata file has an extensible markup language (XML) format.

15. A system according to claim 13, wherein the video asset includes a video file, a broadcast program, a video game, or a combination thereof.

16. A system according to claim 13, wherein the asset parser receives the metadata file from a content provider system that maintains the video asset.

17. A system according to claim 13, further comprising:

a rules database configured to store a plurality of rules for ranking the attributes.

* * * * *